US007710062B2

(12) United States Patent
Hsu

(10) Patent No.: US 7,710,062 B2

(45) Date of Patent: May 4, 2010

(54) DRIVER WITH A REVERSE-ROTATION PREVENTER FOR AN INFLATABLE ROTATING EXHIBIT

(75) Inventor: Sheng-Hung Hsu, Kaohsiung Hsien (TW)

(73) Assignee: Gemmy Industries Corporation, Coppell, TX (US)

( * ) Notice: Subject to any disclaimer, the term of this patent is extended or adjusted under 35 U.S.C. 154(b) by 593 days.

(21) Appl. No.: 11/783,533

(22) Filed: Apr. 10, 2007

(65) Prior Publication Data

US 2008/0250683 A1 Oct. 16, 2008

(51) Int. Cl.
*H02P 6/24* (2006.01)
*G09F 11/02* (2006.01)

(52) U.S. Cl. ...................... 318/715; 248/349.1; 173/16; 40/473

(58) Field of Classification Search ................ 318/715; 248/349.1; 173/15, 16, 216; 40/473; 446/236
See application file for complete search history.

(56) References Cited

U.S. PATENT DOCUMENTS 4,312,199 A * 1/1982 Uyeda ......................... 70/316
5,967,277 A * 10/1999 Walter ........................ 192/43.1
6,035,947 A * 3/2000 Chung ........................ 173/93.5
7,118,507 B2 * 10/2006 Tomita et al. ............... 475/263
2005/0194509 A1 * 9/2005 Tsai et al. ................ 248/349.1
2008/0252249 A1 * 10/2008 Hsu ........................... 318/715

* cited by examiner

*Primary Examiner*—Walter Benson
*Assistant Examiner*—Eduardo Colon-Santana
(74) *Attorney, Agent, or Firm*—Hershkovitz & Associates, LLC; Abraham Hershkovitz

(57) ABSTRACT

A driver with a reverse-rotation preventer for an inflatable rotating exhibit is mounted inside an inflatable rotating exhibit having a transparent inflatable body and a rotating body and has a rotating assembly and a reverse-rotation preventer. The rotating assembly connects to and rotates the rotating body and has a synchronous motor that rotates in a direction and has a shaft. The shaft is driven by the synchronous motor and rotates the rotating body. However, the synchronous motor will reverse its rotation when the rotating body encounters even temporary resistance while rotating. The reverse-rotation preventer applies a resistance when the rotating body rotates in the wrong direction to make the synchronous motor reverse rotation. Consequently, the reverse-rotation preventer ensures that the rotating inflatable exhibit rotates in the desired direction.

8 Claims, 4 Drawing Sheets

DRIVER WITH A REVERSE-ROTATION PREVENTER FOR AN INFLATABLE ROTATING EXHIBIT

BACKGROUND OF THE INVENTION

1. Field of the Invention

The present invention relates to a driver, and more particularly to a driver with a reverse-rotation preventer for an inflatable rotating exhibit to ensure that the inflatable rotating exhibit rotates in a desired direction.

2. Description of the Prior Arts

Conventional inflatable rotating exhibits are usually displayed on shelves or at an entrance to an exhibition to indicate the theme of the exhibition or to function as an attractive advertisement. The inflatable rotating exhibit usually includes a transparent inflatable body, a driver and a rotating body. The transparent inflatable body has a top and a bottom. The driver is mounted inside the inflatable body at the top and has a shaft. The rotating body is mounted inside the inflatable body on the shaft and rotates when the driver operates.

The driver in the conventional inflatable rotating exhibit often uses a conventional synchronous motor as a prime mover. However, the conventional synchronous motor reverses when excessive resistance is applied to rotation during operation. Thus, the rotating body will rotate in an unpredictable direction when no reverse-rotation preventer is mounted in the inflatable rotating exhibit.

To overcome the shortcomings, the present invention provides a drive with a reverse-rotation preventer for an inflatable rotating exhibit product to mitigate or obviate the aforementioned problems.

SUMMARY OF THE INVENTION

The primary objective of the present invention is to provide a driver with a reverse-rotation preventer that keeps an inflatable rotating exhibit rotating in a desired direction.

A driver with a reverse-rotation preventer for an inflatable rotating exhibit in accordance with the present invention is mounted inside an inflatable rotating exhibit having a transparent inflatable body and a rotating body and has a rotating assembly and a reverse-rotation preventer.

The rotating assembly connects to and rotates the rotating body and has a synchronous motor.

The synchronous motor rotates in a direction and has a shaft. The shaft is driven by the synchronous motor and rotates the rotating body. However, the synchronous motor will reverse its rotation when the rotating body encounters even temporary resistance while rotating.

The reverse-rotation preventer applies a resistance when the rotating body rotates in the wrong direction to make the synchronous motor reverse rotation again to the desired direction. Consequently, the reverse-rotation preventer ensures that the rotating inflatable exhibit rotates in the desired direction.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
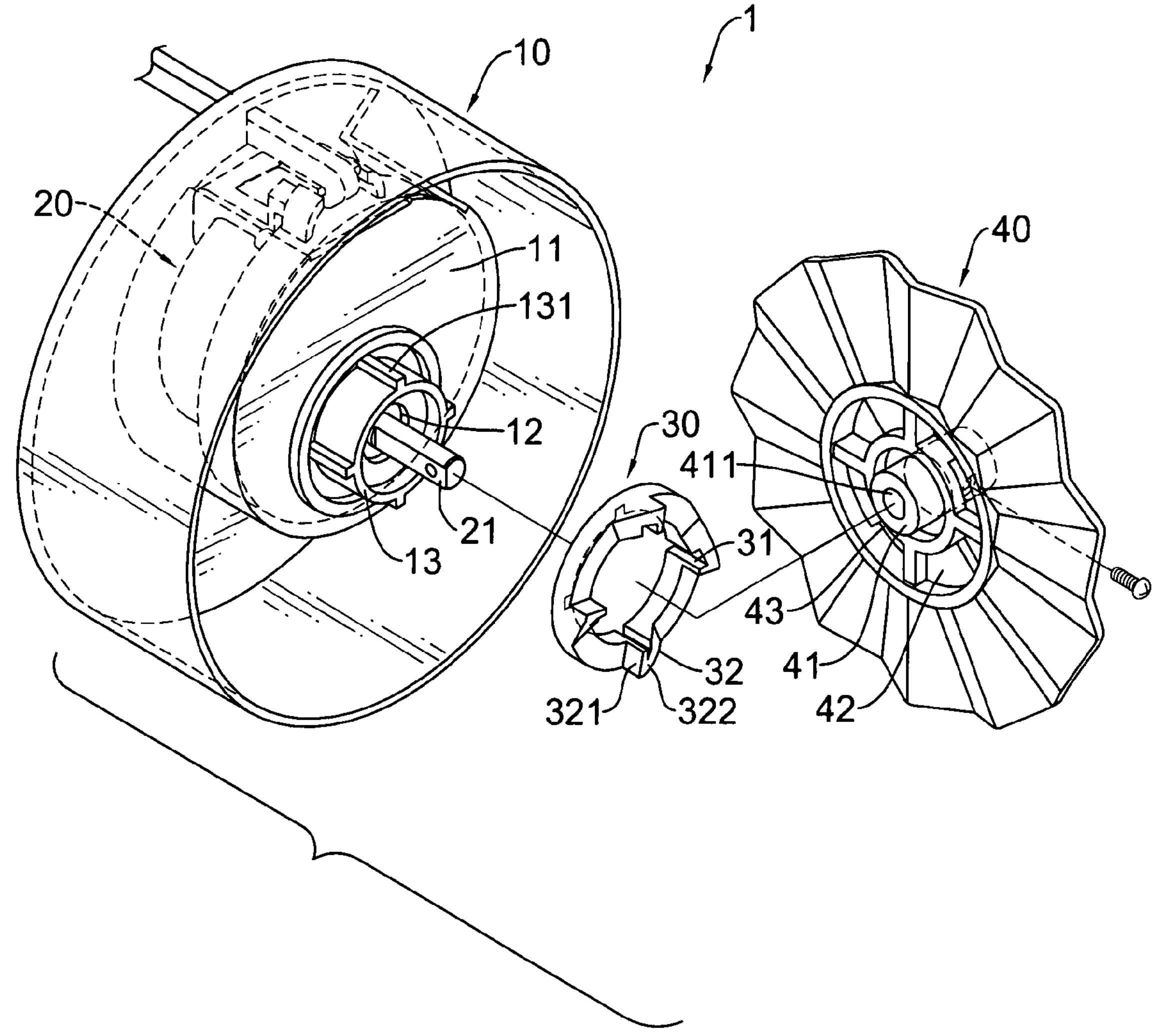
FIG. 1 is an exploded perspective view of a driver with a reverse-rotation preventer for an inflatable rotating exhibit in accordance with the present invention.
Figure 4:
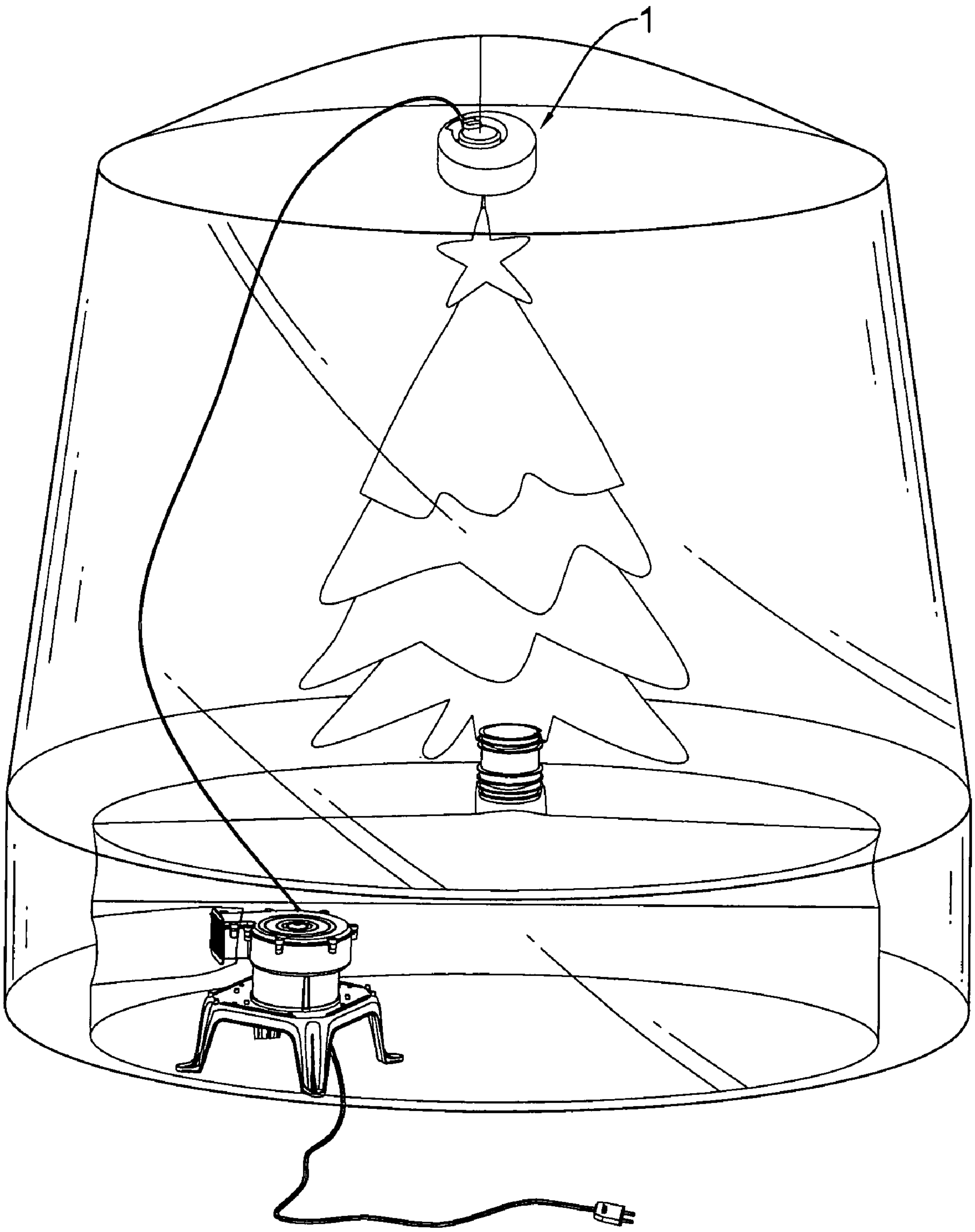
FIG. 4 is a perspective view of a rotating inflatable exhibit with the driver in FIG. 1.

With reference to FIGS. 1 and 4, a driver (1) with a reverse-rotation preventer for an inflatable rotating exhibit in accordance with the present invention comprises a base (10), a synchronous motor (20), a reverse-rotation. preventer (30) and a rotating assembly (40).

Figure 2:
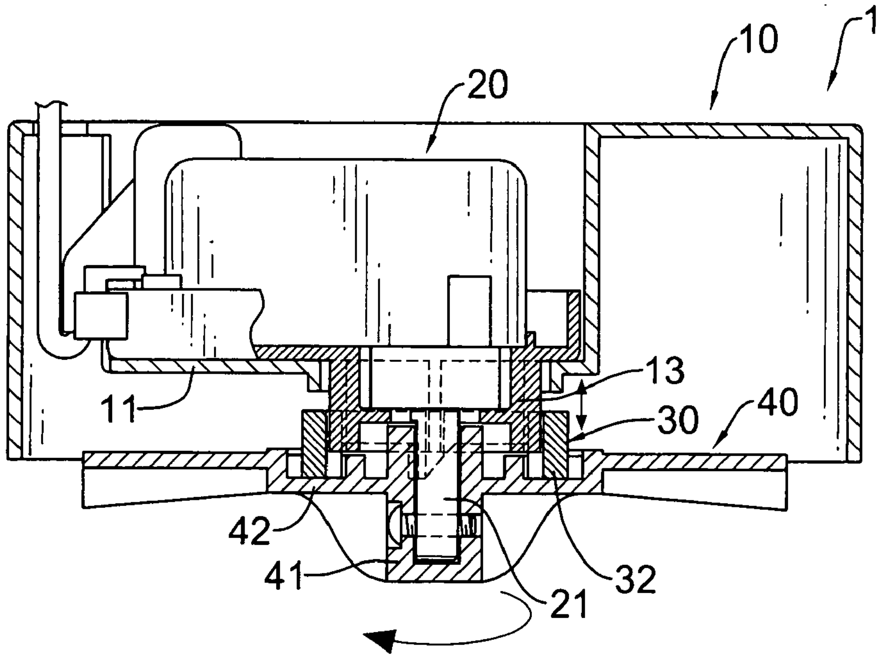
FIG. 2 is an operational side view in partial section of the driver in FIG. 1 rotating in a desired direction.
Figure 3:
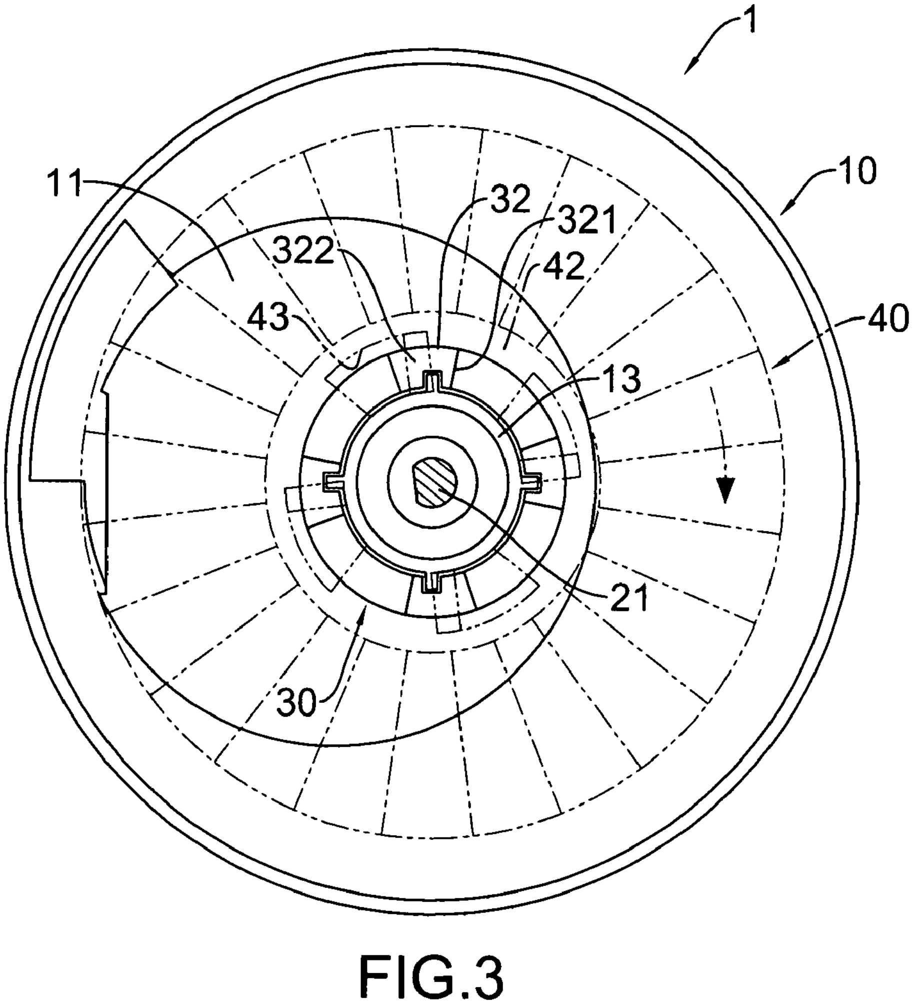
FIG. 3 is an operational top view in partial section of the driver in FIG. 1 rotating in a desired direction.

With further reference to FIGS. 2 and 3, the base (10) has an inner side, a motor mount (11), a hole (12) and a preventer bracket (13).

The motor mount (11) is mounted in the inner side of the base (10) and has a lower surface and an upper surface.

The hole (12) is formed longitudinally in the motor mount (11).

The preventer bracket (13) is a cylinder, is mounted securely on the lower surface of the motor mount (11), protrudes in from the motor mount (11) and coaxially around the hole (12) and has an outer surface and at least one optional rib (131). The at least one rib is formed longitudinally on the outer surface of the preventer bracket (13).

The synchronous motor (20) is mounted on the upper surface of the motor mount (11), rotates in a direction when the driver (1) operates, reverses direction when the driver (1) encounters an even temporary resistance and has a shaft (21).

The shaft (21) is keyed, is connected to and driven by the synchronous motor (20) and is mounted rotatably through and extends out of the hole (12) in the base (10).

The reverse-rotation preventer (30) is annular, is mounted coaxially around the preventer bracket (13), is axially slidable and nonrotationally secure relative to the preventer bracket (13) and has an inner surface, a distal end, at least one optional slot (31) and at least one pawl (32).

The at least one slot (31) is formed longitudinally in the inner surface of the reverse-rotation preventer (30) and corresponds respectively to and engages the at least one rib (131).

The pawl (32) protrudes longitudinally from the distal end of the reverse-rotation preventer (30) and has a stop (321) and an inclined surface (322). The stop (321) protrudes longitudinally from the distal end of the reverse-rotation preventer (30) and has a distal edge. The inclined surface (322) may be a straight surface and connects to the distal edge of the stop (321) and the distal end of the reverse-rotation preventer (30).

The rotating assembly (40) may be a disk, is mounted coaxially securely around and is driven by the shaft (21), abuts the preventer bracket (13), holds the reverse-rotation preventer (30) and has a center, an optional shaft tube (41), a base plate (42) and at least one opening (43).

The shaft tube (41) is formed coaxially in the center of the rotating assembly, is mounted securely around the shaft (21) and has a proximal end and a cavity (411). The cavity (411) is formed in the proximal end of the shaft tube (41) and corresponds to and is mounted around the keyed shaft (21) to mount the rotating assembly (40) securely around the shaft (21).

The base plate (42) is formed in the center of the rotating assembly (40) and keeps the reverse-rotation preventer (30) from falling when the driver (1) operates.

The opening (43) is formed in the base plate (42), corresponds to the pawl, allows the pawl (32) to drop into as the opening (43) passes the pawl (32) while rotating and has a radial edge.

Figure 5:
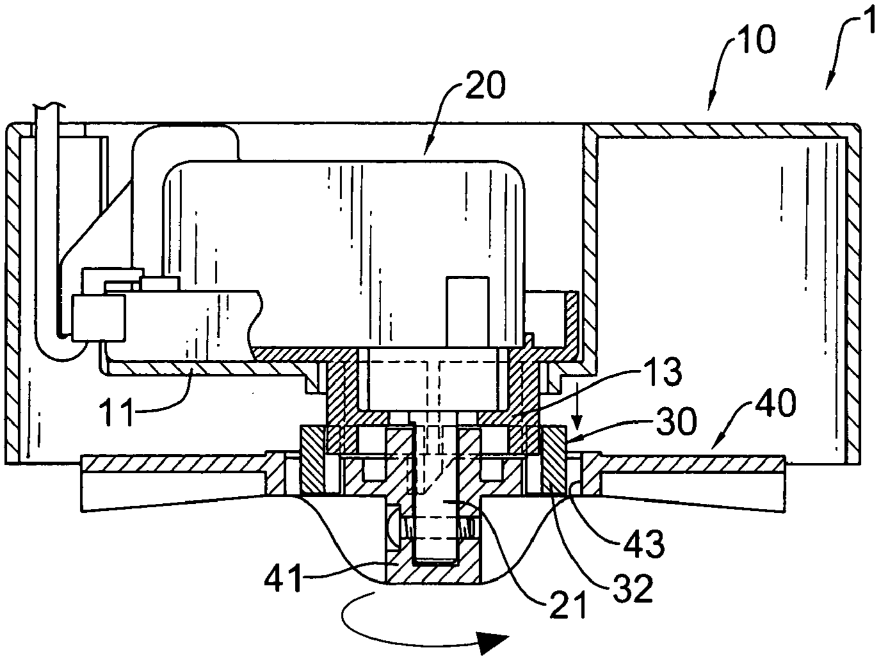
FIG. 5 is an operational side view in partial section of the driver in FIG. 1 when the driver reverses direction.
Figure 6:
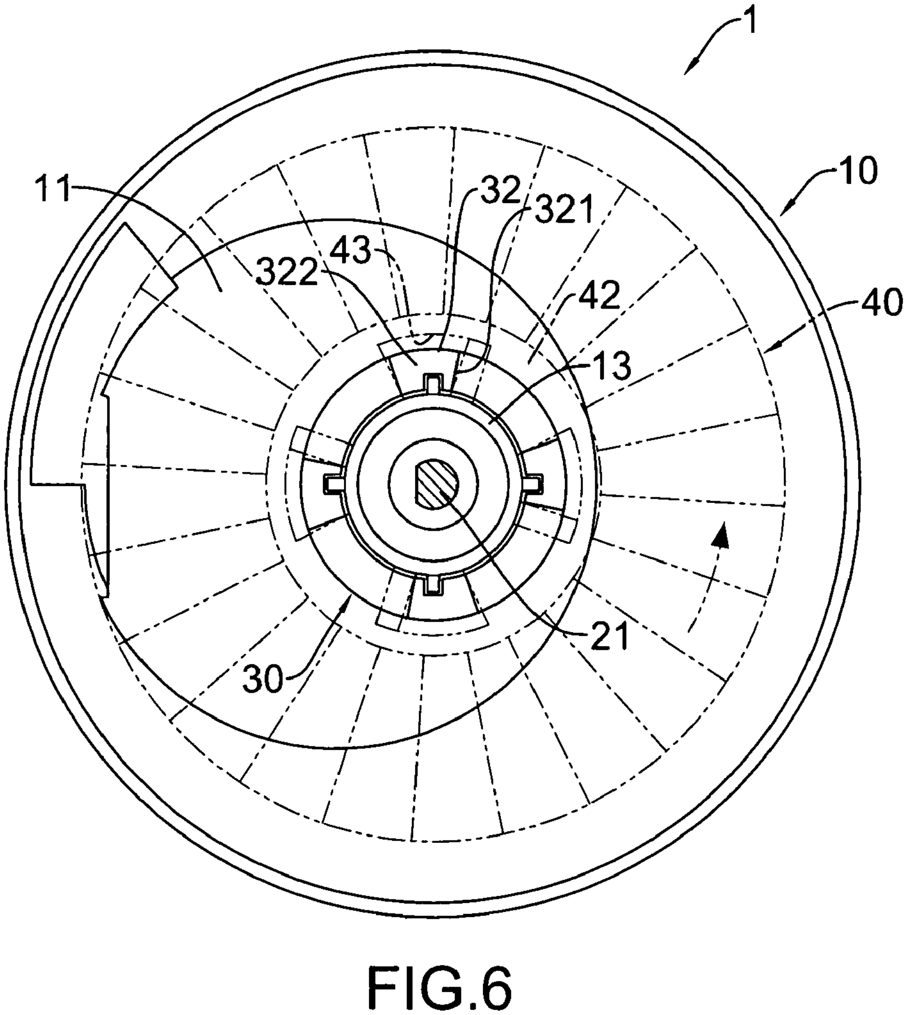
FIG. 6 is an operational top view in partial section of the driver in FIG. 1 when driver reverses direction.

With further reference to FIGS. 5 and 6, the radial edge of the opening (43) encounters the inclined surface (322) first when the driver (1) rotates in the desired direction and encounters the stop (321) first to block rotating assembly (40) and make the driver (1) reverse to the desired direction to ensure that the driver (1) only rotates in the desired direction.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A driver with a reverse-rotation preventer for an inflatable rotating exhibit comprising a base having
  an inner side;
  a motor mount being mounted in the inner side of the base and having
    a lower surface; and
    an upper surface;
  a hole being formed longitudinally in the motor mount; and
  a preventer bracket being a cylinder, being mounted securely on the lower surface of the motor mount, protruding in from the motor mount, co-axially around the hole and having an outer surface;

a synchronous motor being mounted on the upper surface of the motor mount, rotating in a direction when the driver operates, reversing direction when the drive encounters an even temporary resistance and having a shaft being keyed, being connected to and driven by the synchronous motor and being mounted rotatably through and extending out in the hole of the base;

a reverse-rotation preventer being annular, being mounted co-axially around the preventer bracket, being axially slidable and rotationally secure relative to the preventer bracket, and having
  an inner surface;
  a distal end; and
  at least one pawl protruding longitudinally from the distal end of the reverse-rotation preventer and having
    a stop protruded longitudinally from the distal end of the reverse-rotation preventer and having a distal edge; and
    an inclined surface connecting to the distal edge of the stop and the distal end of the reverse-rotation preventer; and a rotating assembly being mounted coaxially securely around and being driven by the shaft, abutting the preventer bracket, holding the reverse-rotation preventer and having
  a center;
  a base plate being formed in the center of the rotating assembly and keeping the reverse-rotation preventer from falling; and at least one opening being formed in the base plate, corresponding to the at least one pawl to allow the pawl to drop into the opening and having a radial edge.

2. The driver as claimed in claim 1, wherein the preventer bracket of the base further has at least one rib formed longitudinally securely on the outer surface of the preventer bracket; and
  the reverse-rotation preventer further has
    at least one slot formed longitudinally in the inner surface of the reverse-rotation preventer and corresponding respectively to and engaging the at least one rib.

3. The driver as claimed in claim 2, wherein the rotating assembly further has a shaft tube formed coaxially in the center of the rotating assembly, mounted securely around the shaft and having
  a proximal end; and
  a cavity formed in the proximal end of the shaft tube and corresponding to and mounted around the keyed shaft.

4. The driver as claimed in claim 3, wherein the inclined surface of the at least one pawl of the reverse-rotation preventer is a straight surface.

5. The driver as claimed in claim 4, wherein the rotating assembly is a disk.

6. The driver as claimed in claim 1, wherein the rotating assembly further has a shaft tube formed coaxially in the center of the rotating assembly, mounted securely around the shaft and having
  a proximal end; and
  a cavity formed in the proximal end of the shaft tube and corresponding to and mounted around the keyed shaft.

7. The driver as claimed in claim 1, wherein the inclined surface of the at least one pawl of the reverse-rotation preventer is a straight surface.

8. The driver as claimed in claim 1, wherein the rotating assembly is a disk.

* * * * *